Sept. 5, 1961 N. B. NEWTON ET AL 2,998,849
PITCH LOCK SYSTEM
Filed Oct. 15, 1958 3 Sheets-Sheet 1

INVENTORS
NORMAN B. NEWTON
RICHARD L. FISCHER
BY Leonard F. Wekland
ATTORNEY

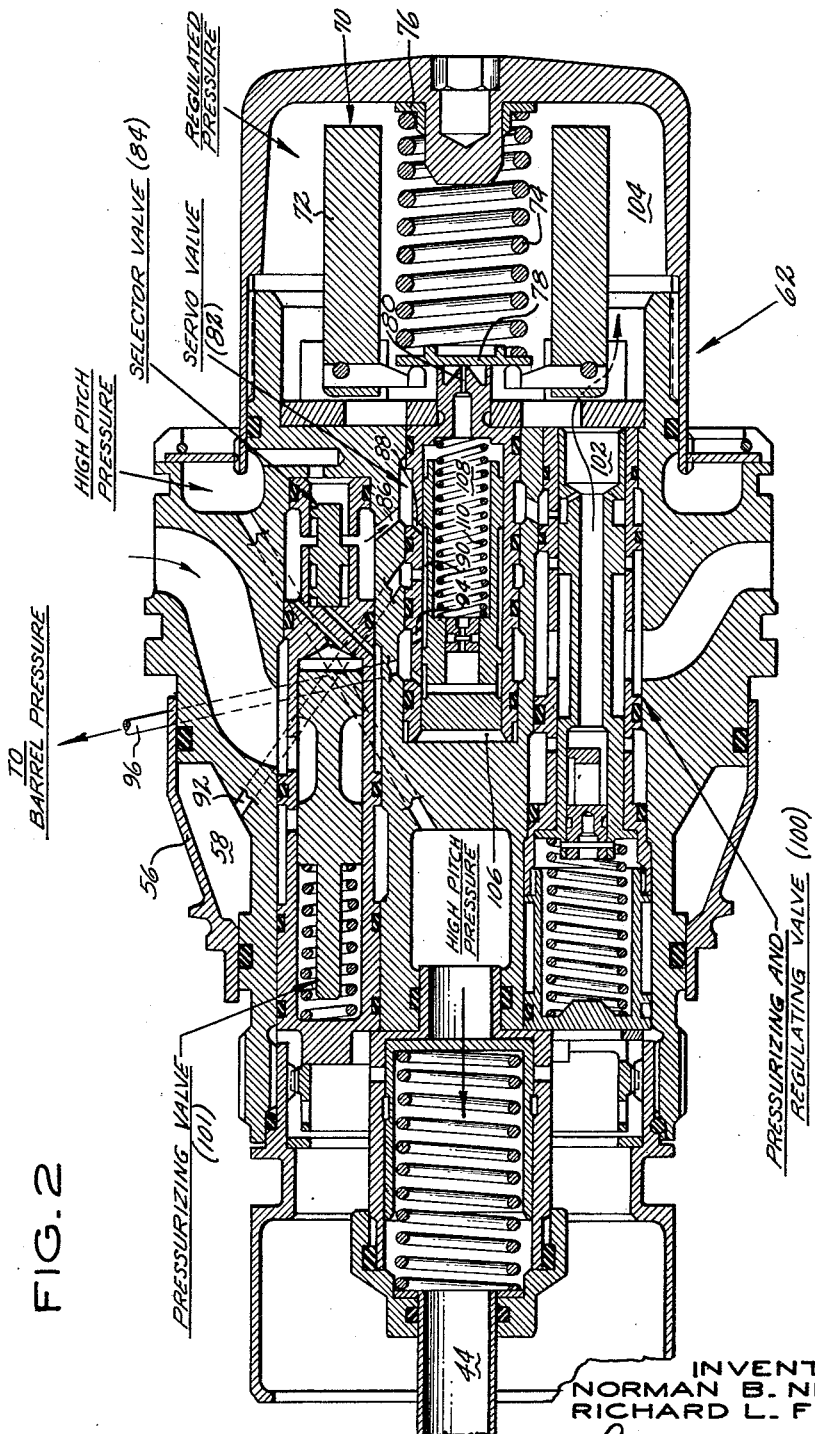

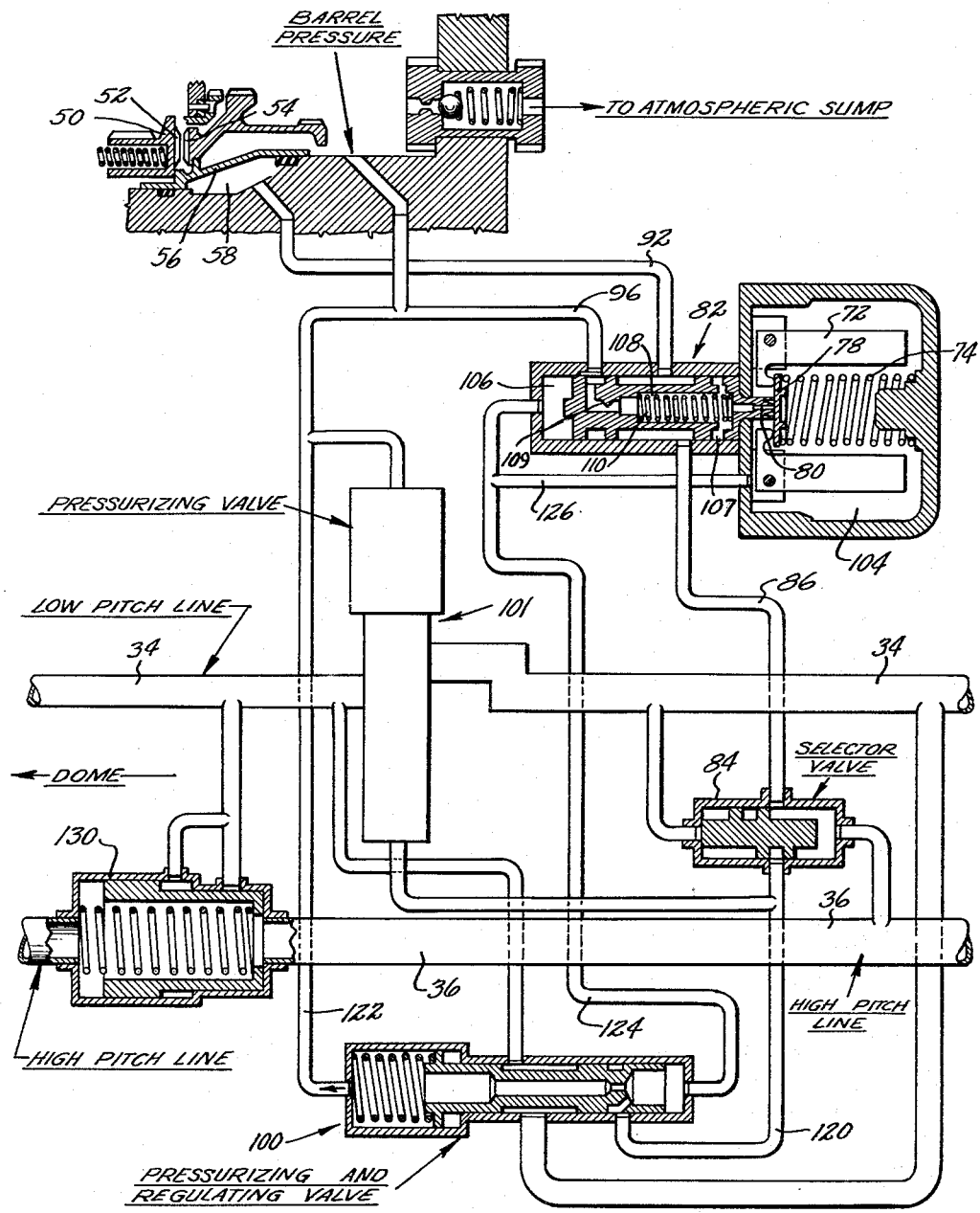

2,998,849
PITCH LOCK SYSTEM

Norman B. Newton, South Glastonbury, and Richard L. Fischer, Suffield, Conn., assignors to United Aircraft Corporation, East Hartford, Conn., a corporation of Delaware
Filed Oct. 15, 1958, Ser. No. 767,308
8 Claims. (Cl. 170—160.2)

This invention relates to variable pitch propellers and more particularly to pitch lock systems for such propellers.

In high performance engine-propeller installations, it is necessary to provide some form of mechanical pitch lock which will prevent the blades from moving in a pitch decreasing direction when certain undesirable operating conditions exist. In the instance of this invention the pitch lock is responsive to a predetermined overspeed of a propeller.

Particularly in gas turbine engines and especially of the constant speed type the r.p.m. band width during which the propeller pitch lock must operate must be extremely narrow. Furthermore, where the power plant has a very highly sensitive fuel control there is usually some provision for obtaining a speed derivative function in the control. Thus, for transient operations there is some form of feedback to provide an anticipation to prevent over-controlling. Under some of these conditions the propeller control may be calling for a lower pitch, but the pitch locks may be engaged if the operative r.p.m. band width of the pitch lock overspeed device is too great. Therefore, it is desirable to have the pitch lock lock up and unlock in a very well-defined minute r.p.m. range.

In patent application Serial No. 699,385 filed by Fischer et al. on November 27, 1957, for Propeller Blade Pitch Lock Control Means, one solution for this problem is described and claimed. In that application a separate disabling means is provided to insure that the pitch lock will not prevent a blade pitch reduction when such pitch change is desired. The type of mechanism described in that application, Serial No. 699,385, is necessary because a spool type of valve is utilized to control the flow of fluid to and from the pitch lock mechanism. Since spool valves are necessarily subject to friction lag, the r.p.m. band over which the pitch lock operates is too wide for use in many high performance engine-propeller installations.

It is therefore a primary object of this invention to provide a pitch lock system for a variable pitch propeller which includes a hydraulically operated mechanical pitch lock controlled by an overspeed device. The overspeed device includes a centrifugal flyweight which controls a flapper valve which in turn by servo power moves the main control valve for the pitch lock.

A further object of this invention is to provide an overspeed device of the type described wherein a spring engages and biases the flapper of the flapper valve in a valve closed direction and the flyweights urge the flapper in a valve open position.

These and other objects of this invention will become readily understood from the following detailed description of the drawings in which:

FIG. 2 is an enlarged detailed drawing of the pitch lock control valve elements; and FIG. 3 is a schematic illustration of an overspeed pitch lock system.

Figure 1:
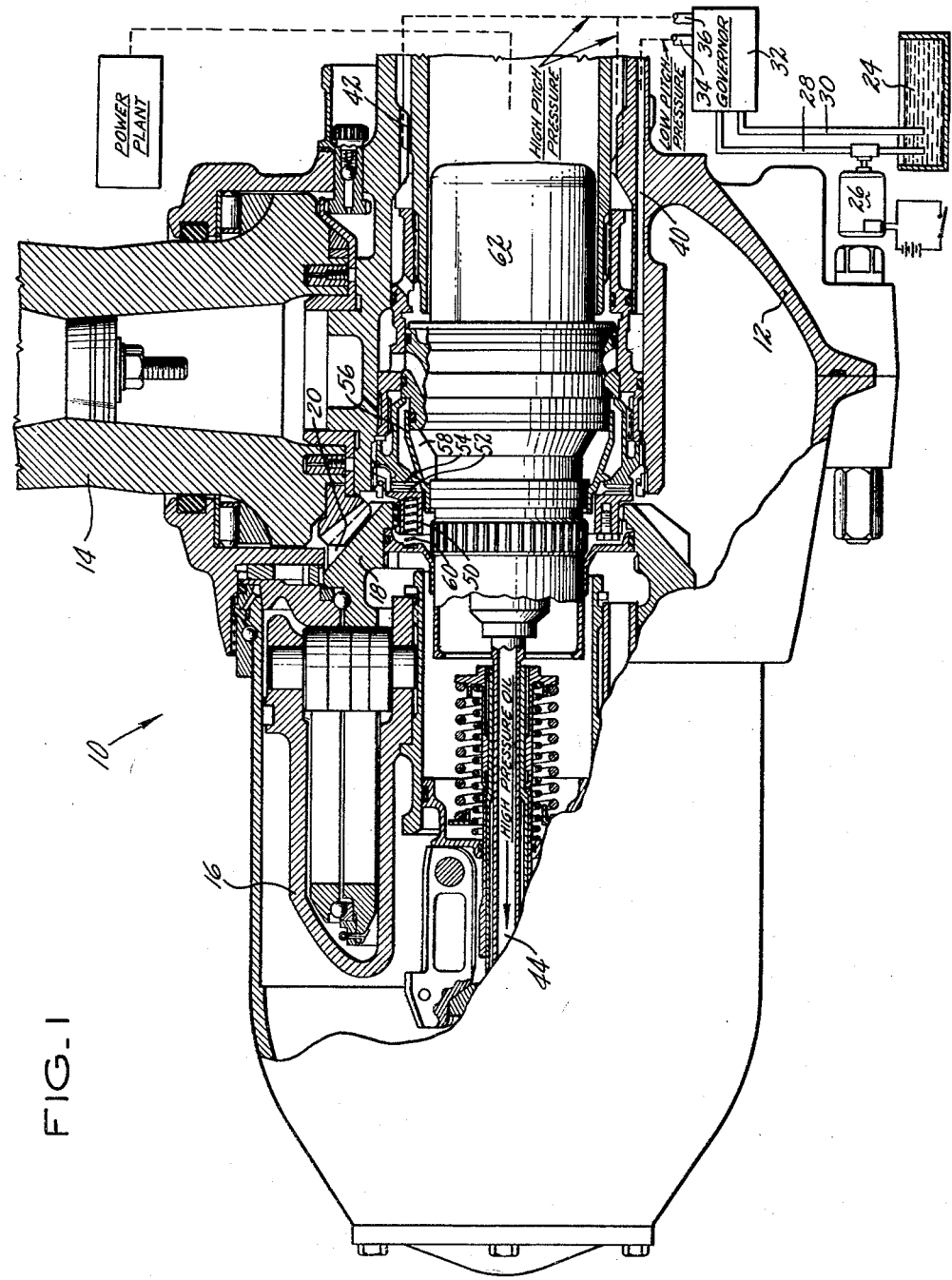
FIG. 1 is a partial cross section of a propeller hub and a partial schematic of the governor system.

Referring to FIG. 1 a propeller hub is generally indicated at 10 including a barrel 12 which supports a plurality of variable pitch blades 14. The blades 14 are mounted for pitch changing movement within the barrel 12. A pitch changing piston 16 is provided which is moved by hydraulic pressure in a forward or aft direction. This forward or aft movement is ultimately transformed into a rotary movement with a member 18 which includes teeth 20 connected to cooperating gear teeth on the base of the blade 14. A pitch changing mechanism includes a fluid reservoir 24 from which fluid is pumped by a motor-pump combination 26 through a line 28 and eventually returned to the reservoir via the line 30. A suitable governor 32 is provided and connects the flow of low and high pitch pressure to the lines 34 and 36, respectively. Low pitch pressure enters the passage 40 and by suitable connections is directed to the back side of the pitch changing piston 16. On the other hand, the high pitch pressure oil passes to the line 36 and through the splines 42 on the engine drive shaft and eventually to the central passage 44 in the propeller dome and then to the front side of the pitch changing piston 16. For further reference to similar pitch changing mechanisms, attention is invited to U.S. Patents Nos. 2,653,668 and 2,758,659 for further detail.

The rotating element 18 of the propeller pitch changing mechanism has splined thereto a member 50 which carries at its forward face a ratchet-type tooth segment 52 which is slidable in a fore and aft direction. A co-operating tooth element 54 is fixed to the barrel and is engageable between teeth 52 to provide a pitch lock for the propeller blades. The element 50 is slidable fore and aft by means of a sleeve or piston 56 which forms a chamber 58 wherein controlled fluid can be conducted. A pitch lock of this sort is more fully described in patent No. 2,703,148 and the above-referred-to Fischer et al. application. A pitch lock is normally held disengaged by the pressure in the chamber 58 and is caused to engage when the pressure in the chamber 58 is drained therefrom in a manner described hereinafter. Under these conditions the springs 60 behind the pitch lock element 50 force the element 50 to the right. The overspeed control which regulates the position of the pitch lock is shown in full at 62.

Essentially there is no direct correlation between the pitch lock governor 62 and the main governor 32 since both mechanisms operate independently of each other. The pitch lock governor is set to function at a higher r.p.m. than the normal governor such that it functions to protect the propeller from any serious damage due to an overspeed should the blade go to a low blade angle.

The pitch lock control 62 is shown in detail in FIG. 2 along with the various regulating valves essential to the operation thereof. The pitch lock control assembly 62 comprises primarily an overspeed governor device 70 which includes a set of flyweights 72 biased by a spring 74. Spring 74 abuts against a fixed stop or abutment 76 at its right end and engages and carries at its left end a flapper 78 which can control the amount of flow through a variable orifice 80. The flapper 78 is centered only by spring 74 and needs no pivot support. The orifice 80 has the opening thereof varied by the flapper 78 such that it comprises a flapper valve which controls the position of a servo valve 82 which controls the pressure of the fluid in the chamber 58 behind the pitch lock piston 56.

A pressure selector valve 84 senses both high pitch and low pitch pressure and selects the higher of these two pressures to feed to the servo valve 82 via a passage 86. The passage 86 is connectable through a passage 88 to the channel 90 through a passage 92 schematically shown in dotted form which connects with the chamber 58. Thus, high pressure can be fed through the aforementioned passages to the chamber 58, or low barrel pressure may be connected to the passage 92 via the passage 94 which in turn connects to the passage 96 and then to the inside of the barrel.

Thus, the servo valve can connect the pitch lock piston chamber 58 with either a high pressure or a substantially low pressure. Barrel pressure in this instance is just slightly above atmospheric.

A pressurizing and regulating valve 100 is provided to establish a control pressure of predetermined value.

The functions of the pressurizing and regulating valve are twofold. First of all, it prevents flow to the low pitch lines until the pitch lock is disengaged, and following this it acts as a pressure regulating valve.

The first function is necessary during starting and the second function minimizes undesirable effects of varying supply pressure on the operation of the flapper valve. One or more additional pressurizing valves 101 may be added for increased flow area to assure more rapid response during high flow conditions. The pressurizing and regulating valve 100 in essence passes a fluid of a predetermined pressure from the chamber 102 into the chamber 104 which surrounds the flyweight 72. This regulated pressure is also conducted by suitable passages (see FIG. 3) to a chamber 106 on the left end of the servo valve 82. When an overspeed exists, the flyweights 72 move outwardly thereby raising the flapper 78 to permit regulated pressure from the chamber 104 to flow through the orifice 80 into the chamber 108 on the righthand side of the selector servo valve 82. Thus, this balances with the regulated pressure existing in the chamber 106 on the left-hand end of the servo valve 82 to thereby balance the pressures on either side thereof. This causes the spring 110 to move the valve to the left to connect the pitch lock chamber 58 with low value barrel pressure via the passage 92 and the passage 94. The amount of opening of each of these passages is regulated by the amount of overspeed.

FIG. 3 is a schematic illustration of the valve arrangement and pitch lock shown in FIGS. 1 and 2. It is believed that a more clear understanding can be had from reference to this figure. Thus, for example, low pitch and high pressure lines 34 and 36 are similar to those shown in FIG. 1. The remaining numbers utilized correspond to the elements shown in FIGS. 1 and 2. The selector valve 84 senses both the pressures in the high and low pitch lines and selects the higher of the two to conduct this pressure first of all to the supply line 86 leading to the servo valve 82. At the same time the selector valve 84 also passes fluid at this selected high pressure to the pressurizing and regulating valve 100 via the line 120. This valve passes drain fluid out through the line 122 but passes a pressure at a predetermined pressure level via the line 124 to both the chamber 106 on the left-hand side of the servo valve and also the chamber 104 which surrounds the flyweights via the passage 126. As stated previously, the flapper 78 is capable of connecting the chamber 104 via the orifice 80 to the right-hand side 108 of the servo valve so as to equalize the pressure on that side with that existing in the chamber 106 on the left-hand side. Thus, the servo valve has its central element movable to a position whereby the passage 92 leading to pitch lock regulating chamber 58 is either connected with the supply line 86 or with barrel pressure via the line 96. The pressurizing and regulating valve 101 is also provided in the system so as to provide a large capacity of flow should the system so require. Furthermore, a surge valve 130 is provided in the system so as to limit the low pitch pressure. This is sometimes called the low pitch relief valve.

The detailed operation of valves 82, 100 and 101 and associated elements is as follows: During a static condition, chamber 58 will be void of fluid pressure and hence the pitch lock will be in engagement. It is virtually impossible to set the blade at a lower pitch when the pitch lock is engaged, thus one of the functions of valve 100 is to prevent the blade from moving toward a lower pitch until the pitch lock is disengaged. This is accomplished by the cooperating functions of these valves. Since valves 100 and 101 are essentially identical except for the pressure regulating feature, valve 101 will be ignored for this discussion. For example, assume that during starting the pilot calls for a lower pitch setting. Since the chamber at the right end of the spool valve in valve 100 contains low pressure fluid, the spring at its opposite end will urge said spool to the right. In this position the upper left-hand land on the spool valve will block off flow to the low pitch line 34 on the dome side. As fluid pressure increases via line 34 and is introduced to selector valve 84, the free-floating piston will be urged to the right connecting line 120 to line 34 via the T connecting line on the left of valve 84. The free-floating piston has an annulus therein, so that at the same time, line 34 is connected with line 86. Simultaneously fluid through line 120 flows through valve 100 by way of an annulus on the right end of the spool and its cooperating passageway to chamber 106 via line 124. Since flapper valve 78 is closed, the fluid pressure in chamber 106 will be higher than the fluid pressure on the right end of the piston generating sufficient force to overcome the force exerted by spring 110, thus urging said piston to the right. In this manner, chamber 58 is connected to line 86 via line 92 and hence allowing the fluid pressure to build up to chamber 58. When this fluid pressure is at a predetermined value, the pitch lock will be disengaged.

As mentioned above, valve 100 regulates the pressure in line 124. This is accomplished by the spring acting on one end of the piston and fluid acting on the opposite end. The land on the lower right end of the spool meters fluid across the port formed at the end of line 120. The volume of fluid permitted to enter from line 120 will be governed by the predetermined spring setting. Thus, for example, if the spring is designed to exert a force of 200 pounds, the fluid pressure in line 124 will be at 200 pounds. Should the pressure in line 124 go below the 200 p.s.i., the spool will move to the right to uncover the port and conversely when the pressure in line 124 goes above 200 p.s.i., then the spool will move to the left blocking off the port.

Of course, draining chamber 58, which will engage the pitch lock, is the main function of the overspeed governor. In essence, when the flyweights 72 sense an overspeed, centrifugal force will urge said flyweights outward lifting valve 78 away from its seat and allowing fluid in chamber 104 (which is at a higher pressure than that appearing on the chamber at the right end of the piston) to ingress into value 82. The valve 78 seats against variable orifice 80 to prevent flow from ingressing into valve 82 during normal flight conditions. Once an overspeed occurs, the valve 78 opens permitting the flow to pass through orifice 80, into chamber 107, past restriction 109, and then to drain or barrel pressure via line 96. Since this opening is substantially larger than the restriction 109 in the piston, more fluid can enter than leave, such that this increased flow will urge the piston to the left. The piston will continue to move to the left since the passageway connecting the chamber at the right of the piston will be disconnected from drain line 96. When the piston is moved to the left, line 92 is connected to drain line 96 which in turn is connected with barrel pressure. Since barrel pressure is a lower pressure than the pressure in chamber 58, the fluid in chamber 58 will be directed out of said chamber allowing the pitch lock to engage.

As mentioned above, the fluid in line 34 upstream of valve 100 and 101 is blocked off by said valves until the pitch lock is disengaged. When this occurs, valve 100 will permit fluid into line 34 downstream of valves 100 and 101. Should the hydraulic mechanism in the propeller dome demand more fluid than valve 100 is capable of supplying, then valve 101 will open to satisfy this demand. The two similar valves were included because the space allowed in one particular propeller application was not sufficient to permit the use of a larger valve which could handle the total flow. Of course, the adverse pressure drops across the valves are to be considered such that the metering of fluid should be accomplished with the least pressure drop. Thus the inclusion of valve 101 is not essential to the operation of this invention.

As a result of this invention a mechanical pitch lock system is provided with a hydraulically controlled system. This hydraulically controlled system comprises a control valve (servo valve 82) which is accurately positioned by means of a flapper valve (78 and 80) which acts as a pilot valve. In this system the friction normally existing in a spool valve is virtually eliminated. In this way the pitch lock can be moved to a lock or unlock position in a very well-defined narrow r.p.m. band.

Although only one embodiment of this invention has been illustrated and described herein, it will be apparent that various changes may be made in the construction and arrangement of the various parts without departing from the scope of the novel concept.

We claim:

1. In a propeller having a hub, a plurality of blades carried by said hub and movable to a number of varied pitch positions relative to the hub, means for varying the pitch position of said blades including a servo motor and high and low pitch pressure lines connected thereto, governor means for controlling the position of said servo motor including connections to said high and low pitch lines, a pitch lock including one element movable with the blades and another element fixed against rotation relative to the hub, spring means urging said lock elements into an engaged position to prevent movement of the blades in a pitch decrease direction, fluid pressure servo means for urging said members into a disengaged position, a servo operated valve device for controlling said fluid pressure means, flapper valve means for controlling the position of said valve device, a speed responsive device for varying the opening of said valve means to regulate said servo device, and means connected to said high and low pitch lines for selecting the higher of the pressures in said lines and conducting the selected pressure to said valve device.

2. In a propeller having a hub, a plurality of blades carried by said hub and movable to a number of varied pitch positions relative to the hub, means for varying the pitch position of said blades including a servo motor and high and low pitch pressure lines connected thereto, governor means for controlling the position of said servo motor including connections to said high and low pitch lines, a sump connected to said governor, a pitch lock including one element movable with the blades and another element fixed against rotation relative to the hub, spring means urging said lock elements into an engaged position to prevent movement of the blades in a pitch decrease direction, fluid pressure servo means for urging said members into a disengaged position, a servo operated valve device for controlling said fluid pressure means including high and low pressure sources, flapper valve means for controlling the position of said valve device, a speed responsive device for varying the opening of said valve means to regulate said servo device to selectively connect said fluid pressure servo means with said sources, and means connected to said high and low pitch lines for selecting the higher of the pressures in said lines and conducting the selected pressure to said valve device.

3. In a propeller having a hub, a plurality of blades carried by said hub and movable to a number of varied pitch positions relative to the hub, means for varying the pitch position of said blades including a servo motor and high and low pitch pressure lines connected thereto, governor means for controlling the position of said servo motor including connections to said high and low pitch lines, a pitch lock including one element movable with the blades and another element fixed against rotation relative to the hub, spring means urging said lock elements into an engaged position to prevent movement of the blades in a pitch decrease direction, fluid pressure servo means for urging said members into a disengaged position, a servo operated valve device for controlling said fluid pressure means, flapper valve means for controlling the position of said valve device, means for supplying said flapper valve means with a predetermined control pressure, a speed responsive device for varying the opening of said valve means to regulate said servo device, and means connected to said high and low pitch lines for selecting the higher of the pressures in said lines and conducting the selected pressure to said valve device.

4. In a speed responsive device for a propeller pitch change mechanism, a centrifugally operated flyweight pivoted at one end, a chamber enclosing said flyweight, means for rotating said flyweight about an axis whereby said flyweight moves about said pivot away from said axis, a compression spring urging said flyweight toward the axis of rotation thereof, a flapper valve in said chamber, said valve including an orifice and a flapper for varying the opening of the orifice, said flapper being supported by and urged in an orifice closed direction by said spring and being urged in an orifice open position by said flyweight, means for providing said chamber with a predetermined control pressure, a servo actuated pitch lock device, and a servo actuated valve controlled by said flapper valve for regulating said servo actuated lock, said servo actuated valve receiving fluid from said chamber in accordance with the position of said flapper.

5. A servo device for controlling the movement of a servo piston in response to an input signal, including a casing defining a fluid receiving chamber, outlet connection means including a variable orifice formed in the wall of the casing and conducting fluid from the interior of the chamber to the servo piston, valve means cooperating with the orifice for varying the opening thereof, said valve means comprising a free floating flat member, spring means on one face of said member to urge said valve in one direction, the opposite face of said member overlying said orifice, and means in response to the input signal acting on said opposite face urging the valve in an opposite position.

6. A servo device including a servomotor, a fluid expansion chamber connected to said motor for operating the motor, means for controlling the pressure in said chamber and the position of said motor including a fixed orifice between the motor and said chamber, a source of fluid under pressure, variable orifice means controlling the flow of fluid from said source to said chamber, said variable orifice means comprising a movable valve member for varying the opening of said orifice, said member being mounted for substantially free floating bodily movement toward and away from said variable orifice.

7. For a servo system, a servomotor, a control device for controlling said servomotor, a source of fluid under pressure and a drain, a chamber disposed between said control device and said motor, a movable member disposed in said chamber and movable between two fixed positions, said control device comprising valve means including a variable orifice and a free-floating flat-like member cooperating with said orifice to vary the opening thereof, said movable member connecting said servomotor to said source when in one position and connecting both said servomotor and said valve means to drain when in the other position, the position of said movable member being responsive to the position of said free-floating member.

8. A system as defined in claim 7 including an enclosed casing surrounding said free-floating member and defining a fluid receiving chamber, a spring acting on one face of the free-floating member, a centrifugally actuated means in said housing and acting on the opposite face of the free-floating member, said spring and actuating means acting to urge said free-floating member toward and away from said variable orifice.

References Cited in the file of this patent

UNITED STATES PATENTS

| | | |
|---|---|---|
| 2,204,639 | Woodward | June 18, 1940 |
| 2,513,660 | Martin et al. | July 4, 1950 |
| 2,661,806 | Nims | Dec. 8, 1953 |
| 2,761,495 | Greenland | Sept. 4, 1956 |
| 2,796,137 | Lambeck | June 18, 1957 |
| 2,874,711 | Anxionnaz | Feb. 24, 1959 |